US 6,557,292 B1

(12) United States Patent
Howard (10) Patent No.: US 6,557,292 B1
(45) Date of Patent: May 6, 2003

(54) FISHING ROD SUPPORT DEVICE

(76) Inventor: Alexander P. Howard, 1090 Aron St., Cocoa, FL (US) 32927

( * ) Notice: Subject to any disclaimer, the term of this patent is extended or adjusted under 35 U.S.C. 154(b) by 0 days.

(21) Appl. No.: 09/716,795

(22) Filed: Nov. 20, 2000

Related U.S. Application Data (60) Provisional application No. 60/166,874, filed on Nov. 22, 1999.

(51) Int. Cl.[7] ............................................... A01K 97/10
(52) U.S. Cl. ........................................ 43/21.2; 224/922
(58) Field of Search .................. 43/21.2, 23; 224/200; 248/511, 519; D3/221, 260; 135/71, 73, 76; D22/137

(56) References Cited

U.S. PATENT DOCUMENTS

| | | | | |
|---|---|---|---|---|
| 869,128 A | * | 10/1907 | Autenrieth | |
| 1,451,732 A | | 4/1923 | Hipwood | |
| 2,085,654 A | * | 6/1937 | Harris | 43/25 |
| D128,132 S | * | 7/1941 | Bell | D22/142 |
| 2,539,080 A | | 1/1951 | Hoover | 248/42 |
| 2,995,855 A | * | 8/1961 | Bell | 43/21.2 |
| 3,287,844 A | | 11/1966 | Hoxter | 43/21.2 |
| 3,964,703 A | | 6/1976 | Adams | 43/21.2 |
| D240,425 S | * | 7/1976 | Gurgiolo | D22/13 |
| 4,041,635 A | * | 8/1977 | Savage | 43/25 |
| 4,238,035 A | * | 12/1980 | Kassanchuk | 211/181.1 |
| 4,498,257 A | | 2/1985 | Jekel | 43/23 |
| 4,674,472 A | * | 6/1987 | Reis | 124/89 |
| 4,817,323 A | | 4/1989 | Braid | 43/21.2 |
| 4,828,152 A | | 5/1989 | Pepping | 224/200 |
| 4,858,364 A | | 8/1989 | Butts | 43/21.2 |
| 4,887,375 A | | 12/1989 | Shedd et al. | 43/21.2 |
| 5,564,217 A | | 10/1996 | Riedell | 43/21.2 |
| 5,685,104 A | * | 11/1997 | Breazeale, Jr. | 42/94 |
| 5,740,625 A | * | 4/1998 | Jenkins | 42/94 |
| 5,813,162 A | * | 9/1998 | Tse et al. | 43/21.2 |
| 5,826,763 A | * | 10/1998 | Roberts | 224/270 |
| 5,845,664 A | * | 12/1998 | Ryder et al. | 135/65 |
| 5,855,086 A | * | 1/1999 | Pandeles | 43/21.2 |
| D413,648 S | * | 9/1999 | Simpson et al. | D22/147 |
| D438,281 S | * | 2/2001 | Webster | D22/147 |
| 6,185,856 B1 | * | 2/2001 | Yakabe | 43/21.2 |

* cited by examiner

*Primary Examiner*—Michael J. Carone
*Assistant Examiner*—Susan Piascik
(74) *Attorney, Agent, or Firm*—Brian S. Steinberger; Law Offices of Brian S. Steinberger, P.A.

(57) ABSTRACT

A simple and easy to manufacture support device for fishing rods having a lower contiguous member with a lower inwardly bent surface being substantially concave with an approximately 20 degree concave bend. An upper member projects upwardly from the top of the contiguous member and has a cavity with a bushing for tightly receiving the butt end of a fishing rod thereon. Wrapped substantially about the entire lower contiguous member is a cushion sleeve that both protects the contiguous member and cushions and reduces discomfort and pain from the body of the fisherman contacting substantially any portion of the hard surfaced lower contiguous member. Also rounded end caps can further reduce discomfort and reduce pain when the device is being used. The lower concave bent surface of the contiguous member can rest comfortably against any body surface such as the abdomen, the sides the arms, the under arms, the armpits, the thigh, and the crotch/groin area of the fisherman. The bent surface allows the weight of the rod to be evenly distributed across the body engaging area of the fisherman without putting all of the weight of the rod on one small body area. The device can be easily and quickly installed and taken off various sized fishing rods, and does not require installment time, extra parts, and adjustments. The support device can additionally be used as a stand for the rod when not being used while the fisherman is fishing. Other versions of the device can include a funnel shaped opening for receiving the butt end of the fishing rods, and having the upper member being substantially parallel to the base members. Furthermore, a rack can be used to store the devices when not being used.

6 Claims, 7 Drawing Sheets

FISHING ROD SUPPORT DEVICE

This invention relates to fishing rods, and in particular to a one piece device for supporting and holding a fishing rod, of which claims the benefit of U.S. Provisional Patent Application No. 60/166,874 filed Nov. 22, 1999.

BACKGROUND AND PRIOR ART

While trawling or reeling in a line it is common for fisherman to place the butt end base of a fishing rod against a portion of their body such as their abdomen and waist area in order to obtain extra leverage while fishing. Usually the most important moment in fishing is the time immediately after a fish bites into the bait on the hook. At this crucial moment, the fisherman must pull back on the rod by placing one hand in between the reel and the butt end of the rod and the other hand above the reel while the butt end of the rod is placed on the thigh, abdomen, their upper arm or their side or even under their arm. While placing the butt end of the rod against a body part is popular and convenient, the constant pressing can cause considerable discomfort and even injury over a long period of time. Additionally, the fisherman usually has to use both hands, one hand to hold the rod from turning and moving and the second hand to start reeling in the line.

Over the years different types of devices have been proposed for supporting fishing devices. For example, floor mounted holders have been proposed. See for example, U.S. Pat. No. 3,964,706 to Adams and U.S. Pat. No. 4,887,375 to Shedd et al. However, these devices require a support surface such as a boat deck and are limited to being fixably mounted to one location, and are not practical for most fisherman that move from location to location to fish.

Over the years various types of support devices have been proposed that use waist attached belts. See for example, U.S. Pat. No. 1,451,732 to Hipwood; U.S. Pat. No. 4,817,323 to Braid; U.S. Pat. No. 4,828,152 to Pepping; and U.S. Pat. No. 4,858,364 to Butts. However, these devices are restricted to supporting the butt end of the rod at one location at a person's abdomen. Thus, the locations of the rods are not readily moveable, and the belts can be heavy and cumbersome to be worn.

Other types of holder devices have been proposed that use a bendable abdomen support. See for example, U.S. Pat. No. 2,539,080 to Hoover; U.S. Pat. No. 3,287,844 to Hoxter; U.S. Pat. No. 4,498,257 to Jekel; and U.S. Pat. No. 5,564,217 to Riedell. However, all of these devices have flat body engaging rod portions which are generally locked perpendicular to the rods, where the body engaging rod portions direct the weight of the rod to be aimed at a small area of the body to support the rod. Thus, the all of the weight of the rod would be supported by body area which is in contact with the body engaging portion of the holder causing discomfort, pain and even injury to the user. Additionally, none of these devices allows for all sides the body engaging rod portions to be cushioned. Thus, the hard surface areas of the lower body engaging rod portions can knock against the user causing further discomfort, pain and even injury to the user. Also the flat body engaging portions of these holders do not allow the holders to be used under one's arm or against curved surfaces such as along a fisherman's sides. Furthermore, all of these devices require plural pieces that require some adjustment to be used. Additionally, the pivotal hinges on Hoover '080 and Hoxter '844 can potentially break over time. Furthermore, the holder devices of Hoxter '844 and Riedell '217 require cords 32 to be used and with the perpendicular base portions where the cords can interfere with getting in the way of a fisherman trying set their hook since the hook can get caught on the cord. Also the location of the cords adjacent to a fisherman's hands can be a safety hazard since the cords can interfere with the fisherman's hands especially while dealing with large fish of up to a thousand pounds, where the cord can cut and even sever one's finger. Furthermore, Riedell '217 requires hookably attaching their cords directly to the rods which requires extra time to install and can even damage the rod by scratching and damaging the rod.

Thus, there exists the need to overcome the problems with the prior art devices.

SUMMARY OF THE INVENTION

The primary objective of the invention is to provide a fishing rod support device of one size that is able to be adapted to be used to support a wide variety of fishing rod butts without having to adjust, remove or add on additional hardware.

The secondary objective of the invention is to provide a fishing rod support device that is safe and effective to give leverage, stability and mobility while fishing.

The third objective of the invention is to provide a fishing rod support device having a curved contoured surface that allows the device to be supported on various body surfaces such as but not limited to the thigh, the groin area, the sides, under one arms, and on the abdomen.

The fourth objective of the invention is to provide a fishing rod support device that distributes the weight of the rod over a larger surface area then the size of the butt end itself.

The fifth objective of the invention is to provide a fishing rod support device having a padded and contoured shaped surface that allows the device to be comfortably placed at different points 360 degrees about a user's body.

The sixth objective of the invention is to provide a fishing rod support device that allows the rod to be laid on top of one thigh while allowing the butt end to the rod to be positioned against the other thigh so that the body is used as both an anchor and stabilizer for the rod.

The seventh objective of the invention is to provide a fishing rod support device which allows the butt end of the rod to be pivotally supported in an armpit with the rod held low towards the water which allows greater leverage to lift a fish upward especially when the fish can become wedged in rocks.

The eight objective of the invention is to provide a fishing rod support device that can be easily and quickly switched from one rod to another with a one hand twist and lock motion.

The ninth objective of the invention is to provide a fishing rod support device that does not have external components such as cords and lines that can get entangled in ones hands, clothing, and jewelry such as one's watch.

The tenth objective of the invention is to provide a fishing rod support device that will not rust or decay while exposed to water and salt air.

The eleventh objective of the invention is to provide a fishing rod support device which is inexpensive to manufacture.

The twelfth objective of the invention is to provide a fishing rod support device which can be used as a stable, non-skid platform when the rod is inverted to change bait, unhook fish, and store the rod and even display new rods in stores.

A fishing rod support device embodiment includes an upper vertical member having an upper side with a cavity surface for tightly securing a butt end of a fishing rod therein, and a lower side, and a contiguous base member having an upper side portion fixably attached to the lower side of the upper vertical member, and a lower inwardly bent side with an inwardly bent surface of approximately a 20 degree concave bend, for engaging both a body portion of a fisherman when to be used during fishing, and for being used as a support stand for holding the fishing rod in a vertical storage position when the rod is not being used for fishing. The cavity surface can further include a bushing and/or grease for tightly receiving the butt end of the fishing rod. A cushion sleeve is further used for covering substantially all of the contiguous base member, wherein both an upper side, a lower side, a front surface and a rear surface of the contiguous lower member is substantially enclosed in the cushion sleeve adding comfort and reducing injury to the fisherman. The edges on the contiguous base member and/or cushioning allows the device to be used as a support stand, wherein the edges of the contiguous base member can rest on a floor surface.

Another embodiment of the invention can have an upper member with a funnel shaped opening for receiving the butt end of the fishing rods. A still another embodiment has the upper member being substantially parallel to the base members. A storage rack allows for the devices to be able to be stored when not being used.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
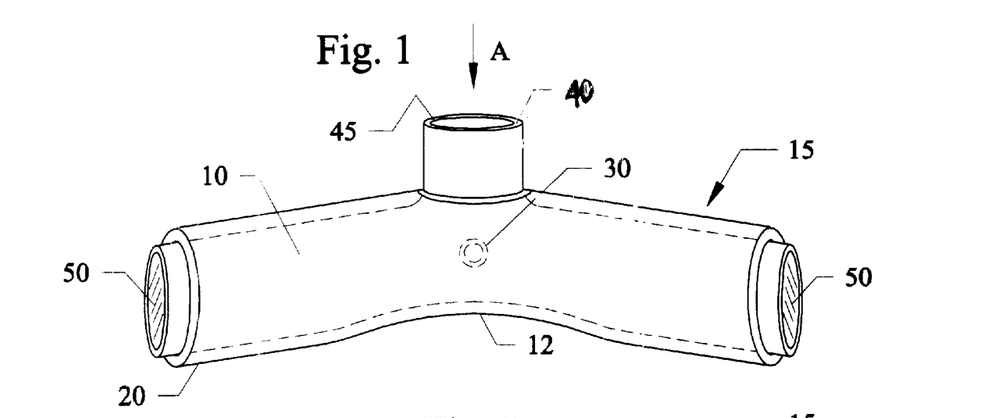
FIG. 1 shows a front view of the novel fishing rod support device.
Figure 2:
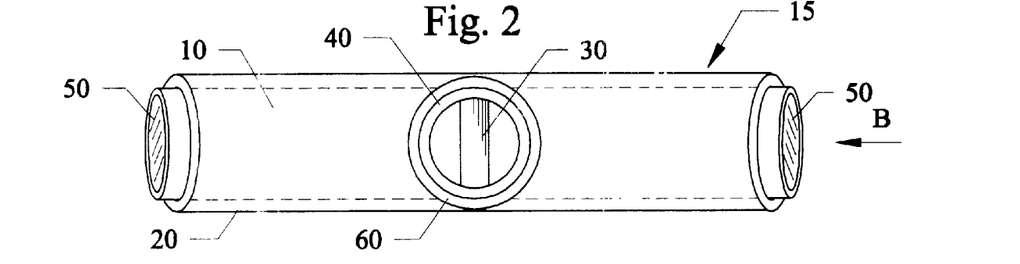
FIG. 2 shows a top view of the fishing rod support device of FIG. 1 along arrow A.
Figure 3:
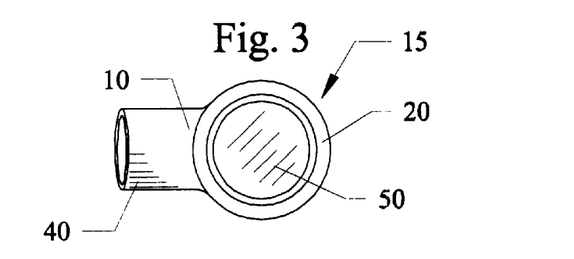
FIG. 3 shows a side view of the fishing rod support device of FIG. 2 along arrow B.
Figure 4:
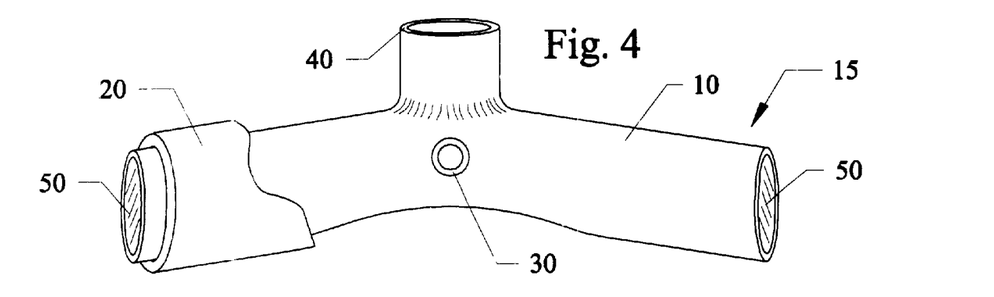
FIG. 4 shows a front view of the fishing rod support device of FIG. 1 with cushion sleeve.

FIG. 1 shows a front view of the novel fishing rod support device 15. FIG. 2 shows a top view of the fishing rod support device 15 of FIG. 1 along arrow A. FIG. 3 shows a side view of the fishing rod support device 15 of FIG. 2 along arrow B. FIG. 4 shows a front view of the fishing rod support device 15 of FIG. 1 with cushion sleeve 20.

Referring to FIGS. 1–4, support device 15 includes a lower longitudinal contiguous member such as a tube base 10 having a sleeve 20 substantially covering the top, front, bottom and rear sides of the tube base 10, where the sleeve 20 can be a flexible material such as a foam padding, neoprene, and the like, that can be approximately 2 mm thick. The lower surface of base 10 is an inwardly bending surface that can be a concave curved surface with an inward bend of approximately 20 degrees. On opposite ends of tube base 10 can be cap covers 50 for closing off the ends of the base 10 that also add a finished look and seals off any raw edges. In upper protruding member 40 is a cavity 45 with a horizontal roll pin 30 inserted therethrough. The support device 15 of the tube base 10 with upper protruding member 40 and caps 50 can be formed from a single piece of aluminum, stainless steel, plastic, PVC, and the like.

Figures 5, 6, 7:
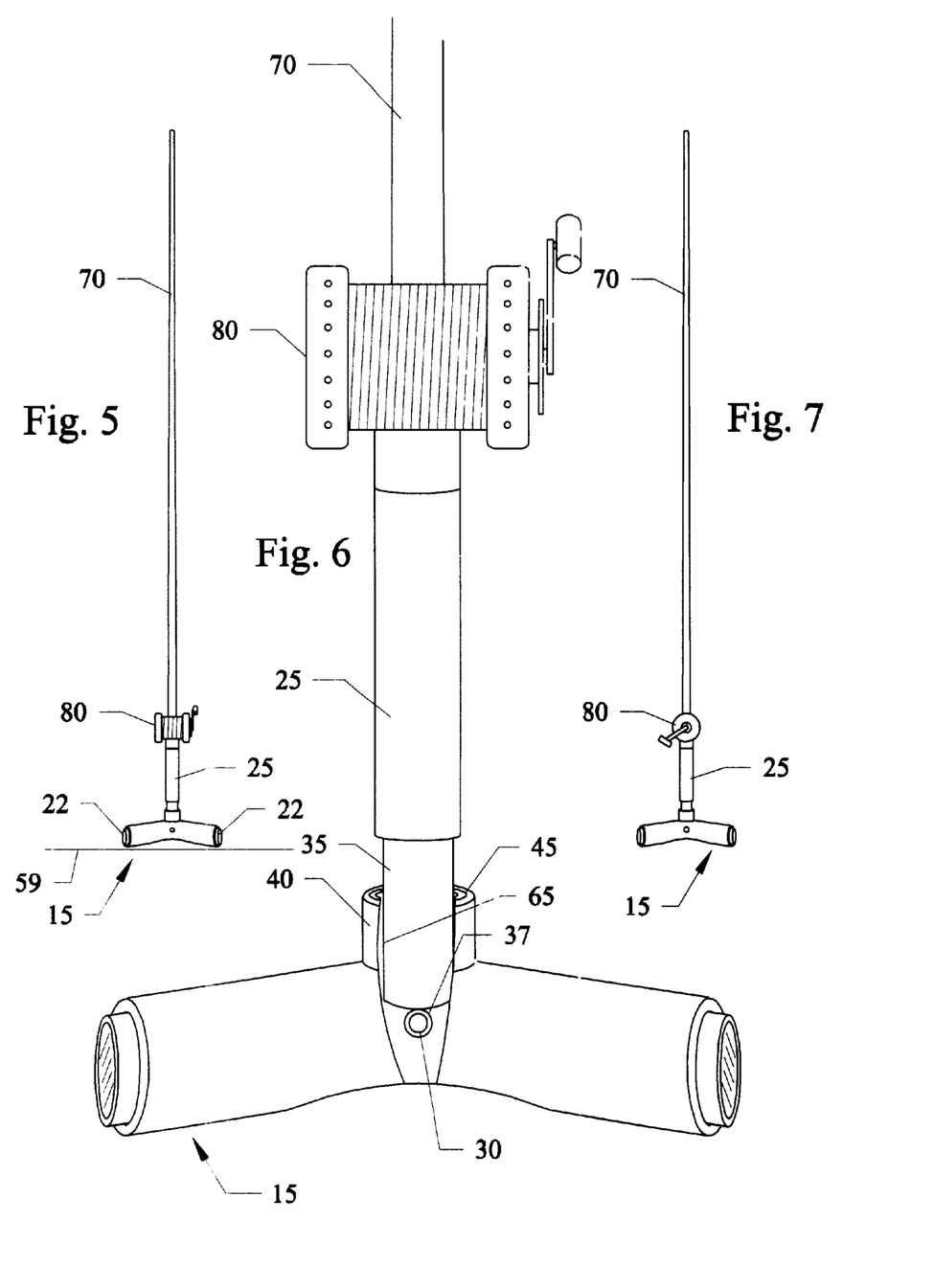
FIG. 5 shows the rod support device of FIG. 1 being used as a storage stand with a rod.
FIG. 6 shows an enlarged view of FIG. 5 with a cut-away of the butt-end of the rod.
FIG. 7 shows a perspective view of FIG. 5 rotated approximately 90 degrees.

FIG. 5 shows the rod support device 15 of FIG. 1 being used as a storage stand with a fishing rod 70 with reel 75 supported by the device 15. FIG. 6 shows an enlarged view of FIG. 5 with a cut-away of the butt-end 35 of the rod 70. FIG. 7 shows a perspective view of FIG. 5 rotated approximately 90 degrees.

Referring to FIGS. 5–7, support device 15 can be used as a stand where bottom edges 22 of the cushion sleeve 20 can abut against a floor surface 59. The roll pin 30 inside the cavity 45 of the upper member 40 can fit within the bottom groove 37 in the butt base 35 of the rod 70. The foam type cushion sleeve 20 gives a non-skid base to store a fishing rod 70 and display fishing rods in stores. Inside the upper member 40 inside cavity 45 can be a flexible deformable bushing 60 such as rubber, and the like, can be used for tightly receiving the butt end 35 of the reel 70. Bushing 60 can be any material that keeps its natural form after being crushed and that will cause a sticking effect that retains the fishing rod support device 15 on the fishing rod 70. Alternatively, grease 65 can also be used. Furthermore, a combination of grease 65 and a flexible bushing 60 can be used. The bushing 60 and/or the grease 65 allows the butt end 35 of the reel 70 be able to be twistably inserted and removed from the cavity 45 of the upper member 40 of the device 15.

Figure 8:
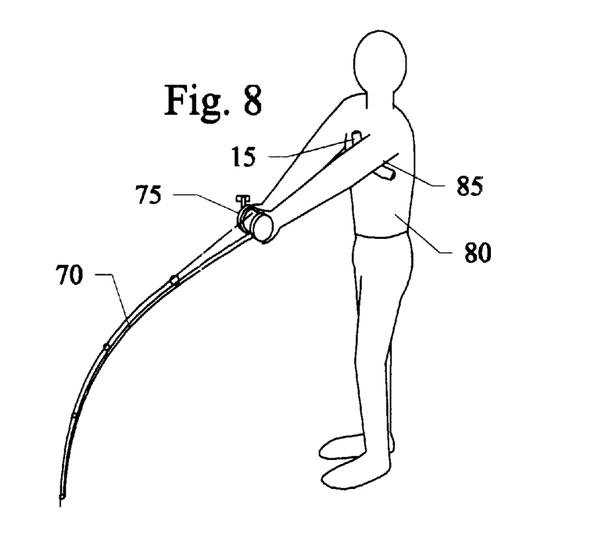
FIG. 8 shows a perspective view of the rod support device of the preceding figures with a rod in use under an arm adjacent to an armpit.

FIG. 8 shows a perspective view of the rod support device 15 of the preceding figures with a rod 70 in use with a fisherman 80 under an arm adjacent to an armpit 85.

Figure 9:
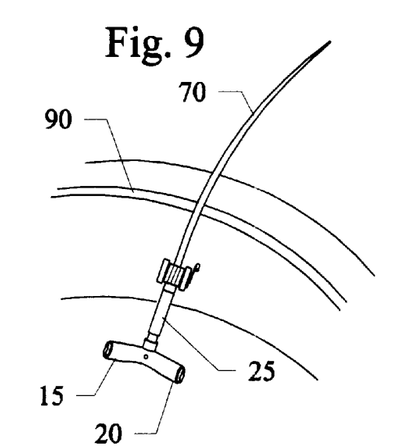
FIG. 9 shows the rod support device of the preceding figures attached to a rod, which is leaning against an inside of a boat that would be used during rigging of a bait.

FIG. 9 shows the rod support device 15 of the preceding figures attached to a rod 70, which is leaning against an inside of a boat 90 that would be used during rigging of bait for the reel 75. The foam type sleeve 20 gives a non-skid stable base to rig the hook.

Figure 10:
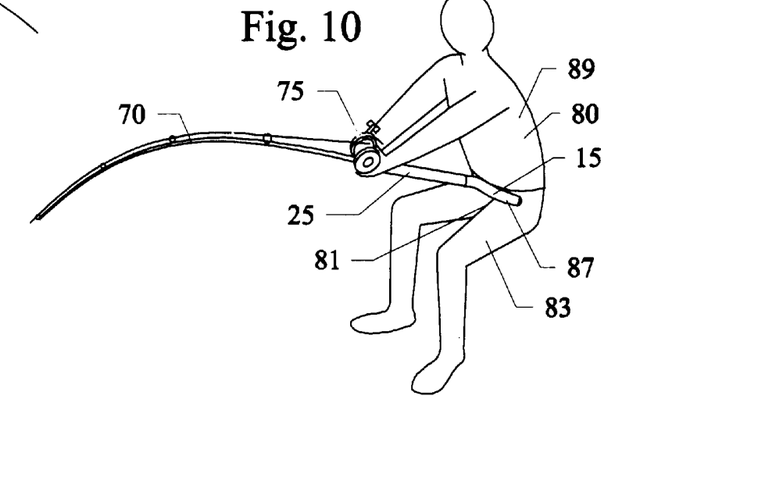
FIG. 10 shows a perspective view of the fishing rod support device with rod in use against the abdomen of a fisherman.

FIG. 10 shows a perspective view of the fishing rod support device 15 with rod 70 in use against the abdomen 87 of a fisherman. Similarly, the device 15 can be supported by the crotch/groin area 81, thigh 83 and sides 89 of a fisherman 80.

Referring to FIGS. 1–10, the fishing rod support device 15 is used to enhance leverage, stability, mobility and comfort. The butt end 35 of a reel 75 is pushed so that the notched/ grooved end 37 is seated about the roll pin 30 inside the cavity 45 of the device 15. A bushing 60 and/or grease 65 allows for different sized butt ends 35 of different sized reels 75 to be inserted therein. The rubber type bushing 60 and/or grease 65 allows for the butt end 35 of the reel 75 to stay inside the rod cavity 45 without any external hardware as described in the prior art devices. The combination and interaction of the bushing 60 and/or grease 65 and cavity 45 supplies the fisherman 80 with one integrated unit 15 that can be affixaby secured to the butt end 35 of the rod 70 until which time the fishing rod 70 can be removed by a one handed motion with a quick tug and a twist to break the suction.

The contoured shaped 12 of the tube base of the base 10 enhances the comfort and stability to the user 80 by conforming to the natural curves of the body 80.

The fishing rod support device 15 can be used to aid fisherman 80 while fishing, and provides an integrated unit that provides safety and efficiency.

Figure 11:
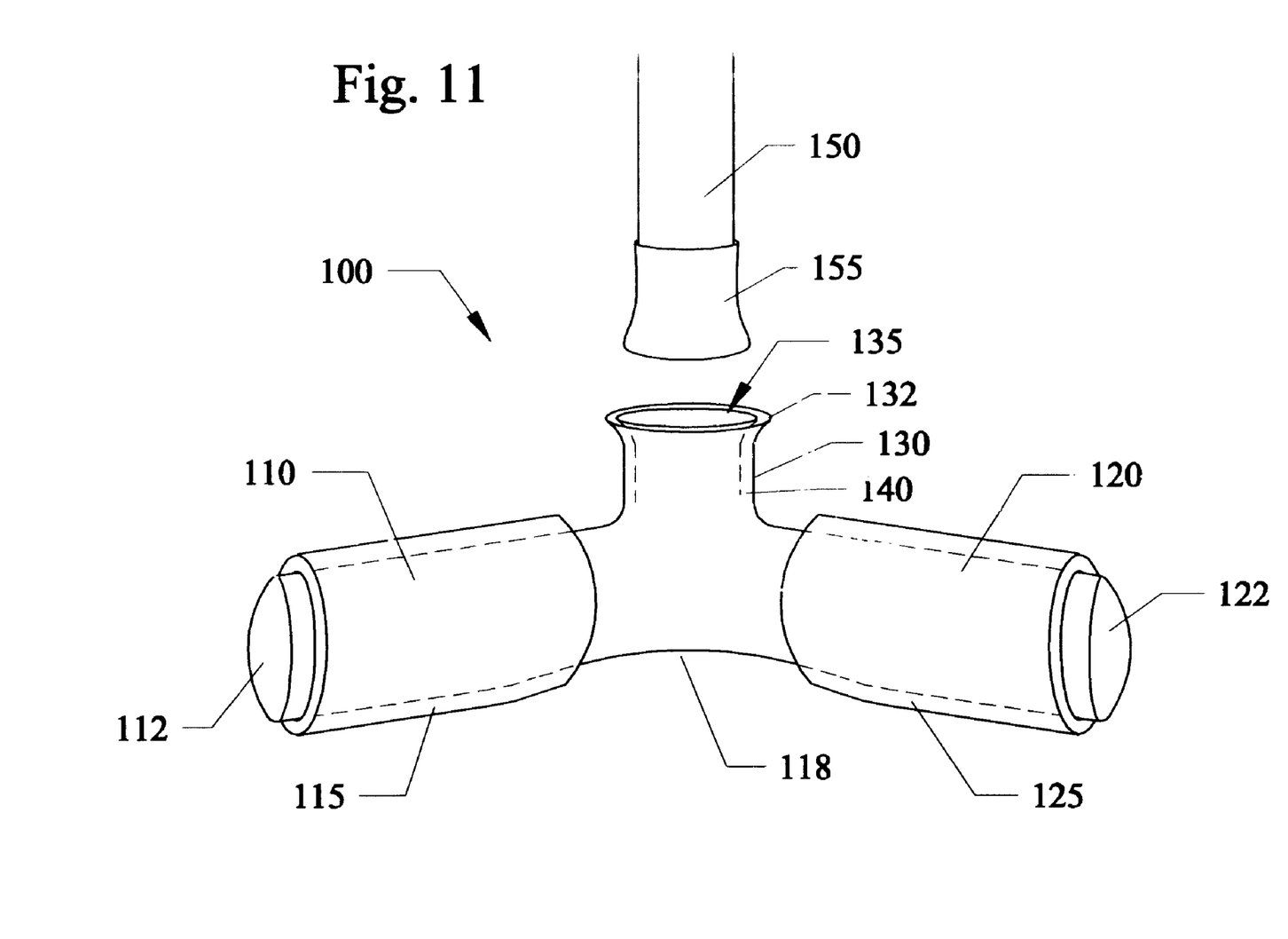
FIG. 11 shows a side view of another embodiment of the fishing rod support device.

FIG. 11 shows a side view of another embodiment 100 of the fishing rod support device having lower base members 110 and 120 that are slightly bent downward where they join one another with a bend 118 of approximately 20 degrees, where the area of the bend has a curved concave edge 118. On the ends of base members 110, 120 can be rounded endcaps 112, 122. Protruding upward from the base members 110, 120 is an upper vertical member 130 having an expandable edged funnel shaped mouth portion 132 for receiving the butt end 155 of fishing rod 150. Inside upper member 130 can be a compressible bushing 140 and/or grease similar to those previously described. Separate compressible type foam sleeves 115, 125 can be wrapped about each base member 110, 120 similar to those previously described, or one single sleeve.

Figure 12A:
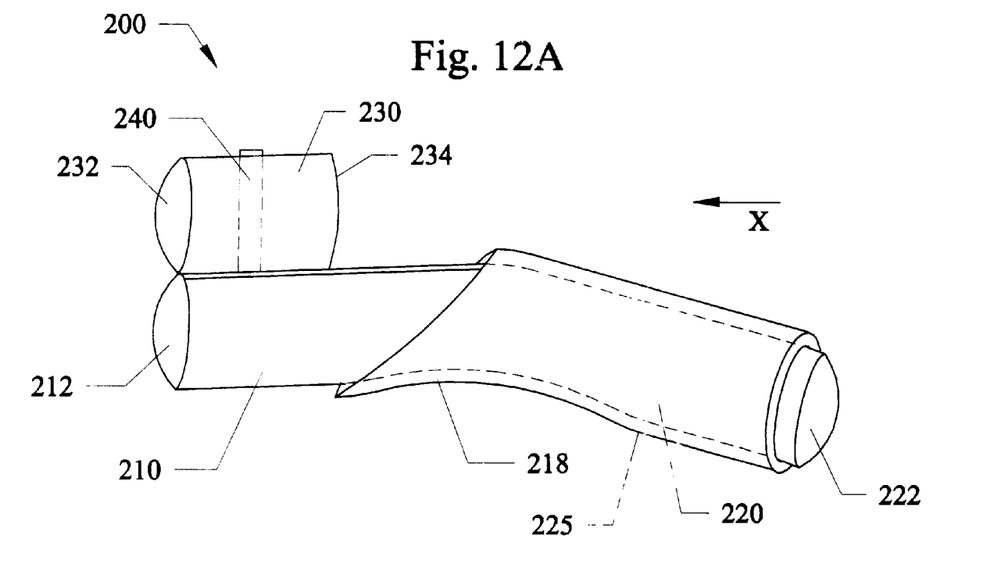
FIG. 12A shows a side view of still another embodiment of the fishing rod support device.
Figure 12B:
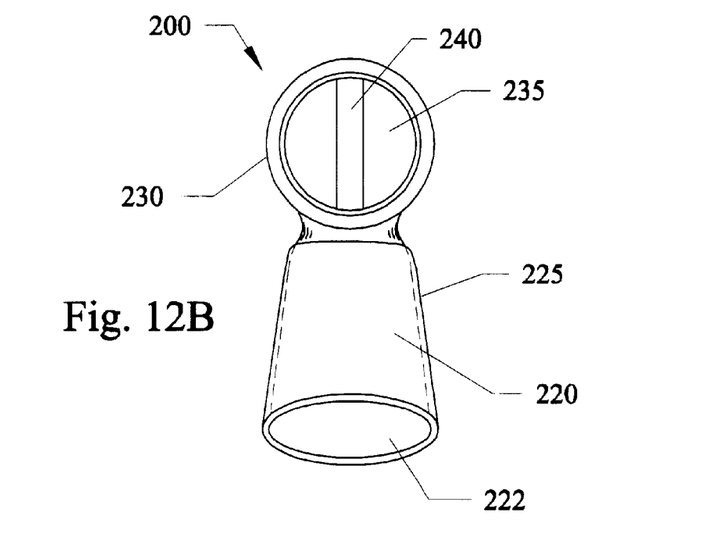
FIG. 12B is an end view of the device of FIG. 12A along arrow X.
Figure 13:
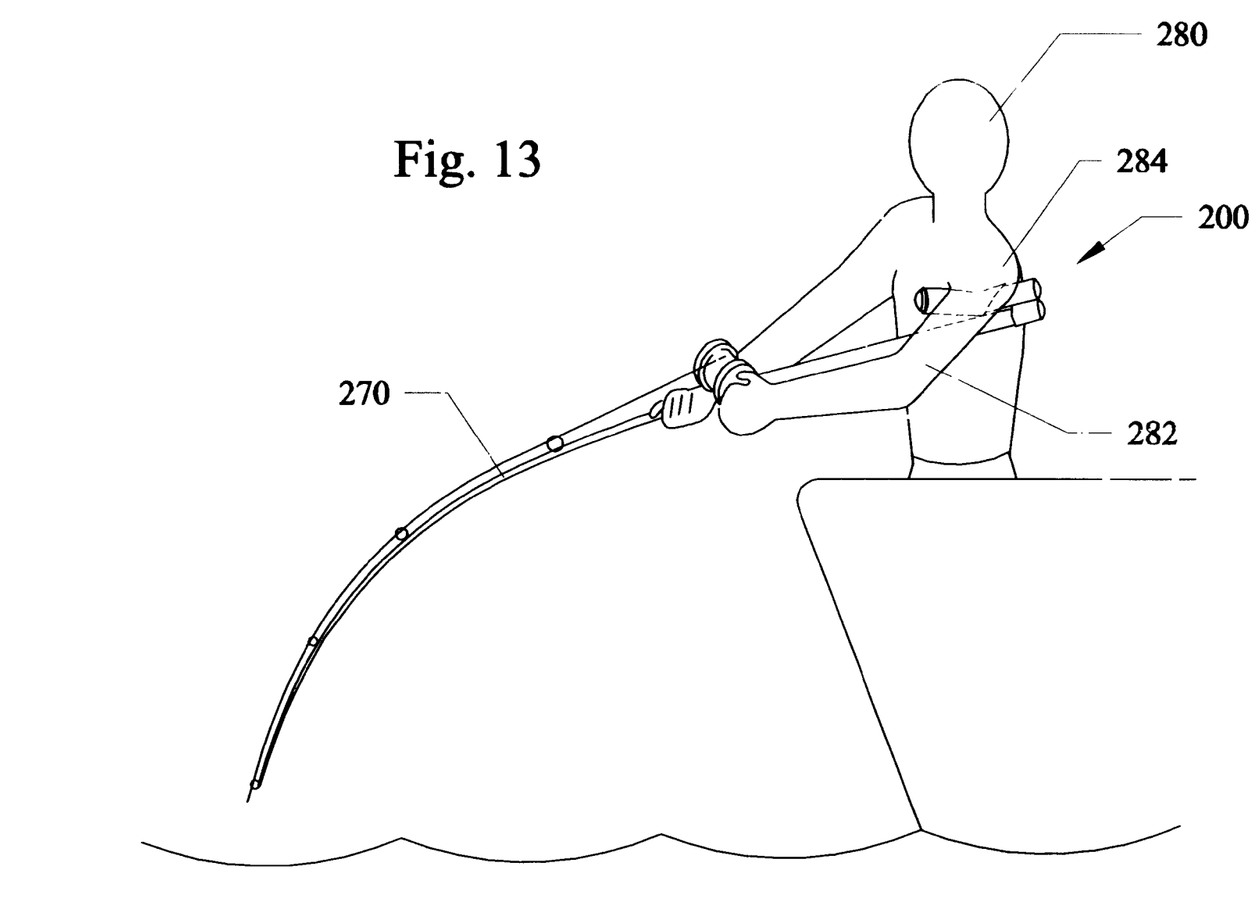
FIG. 13 shows a fisherman using the fishing rod support device embodiment of FIGS. 12A–12B.

FIG. 12A shows a side view of still another embodiment 200 of the fishing rod support device. FIG. 12B is an end view of the device 200 of FIG. 12A along arrow X. FIG. 13 shows a fisherman using the fishing rod support device embodiment 200 of FIGS. 12A–12B. Referring to FIGS. 12A, 12B and 13, embodiment 200 includes two base members 210, 220 similar to those previously described having a concave curved bend 218 therebetween and rounded endcaps 212, 222 on the exposed ends of the base members 210, 220. A compressible foam type sleeve 225 can be wrapped about one or both of the base members 210, 220. Parallel and stacked onto one base member 210 is an upper member 230 mounted thereon having a rounded endcap 232 at one end and an open cavity end 234 with a roll pin 240 inside the cavity end for fitting into the grooved butt end of a fishing rod 270. In operation, the embodiment 200 is a side winder that can comfortably fit under the arm 282 adjacent to an arm pit 284 of the fisherman 280, where the rod 270 when fit within upper member 230 is substantially parallel to base member 210.

Figure 14:
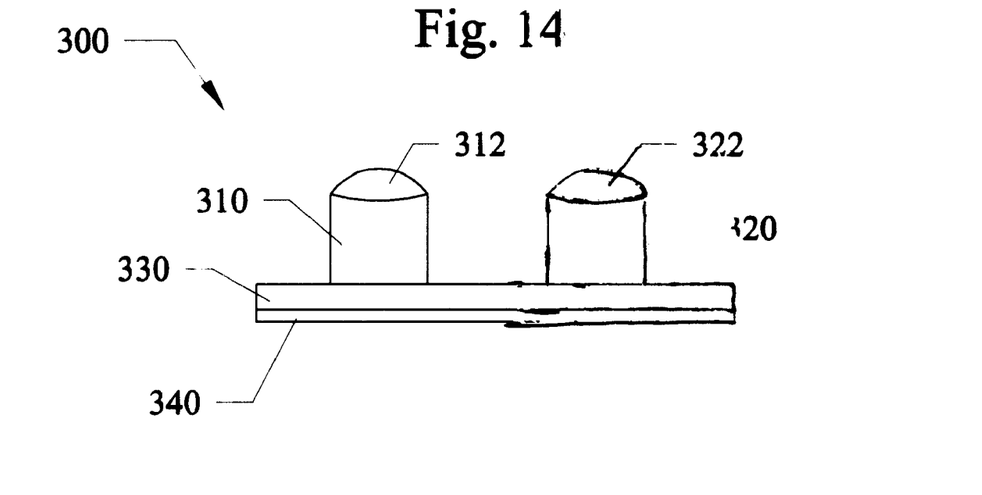
FIG. 14 is a side view of a mounting rack for the fishing rod support devices previously described.
Figure 15:
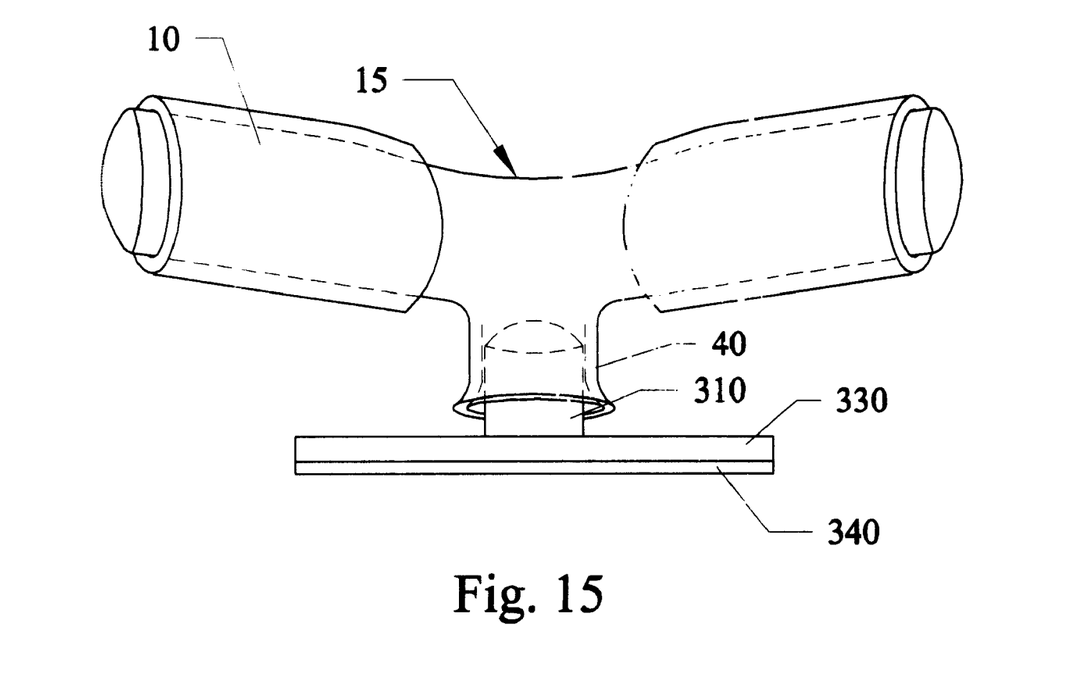
FIG. 15 shows the rack of FIG. 14 being used with a fishing rod support device.

FIG. 14 is a side view of a mounting rack 300 for the fishing rod support devices previously described. FIG. 15 shows the rack 300 of FIG. 14 being used with a fishing rod support device 15. Referring to FIGS. 14–15, a rack 300 can include protruding portions 310, 320 such as cylindrical members each having rounded endcaps 312, 322 that are sized to be able to fit within the cavity openings(40 of the support device 15 of FIG. 1 is shown for example) of the upper members of the fishing rod support devices previously described. The protruding members 310, 320 can be perpendicularly mounted to a support base 330, the latter of which can have a fastening surface 340 such as but not limited to double sided tape, hook and loop fasteners, and the like, so that the rack 300 can be adhered to any surface, such as a tabletop, wall, and the like. The rack can have one, two or more protruding members for mounting various numbers of fishing rod support devices thereon. The rack can be made from injection molded plastic, PVC, metal, aluminum, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A fishing rod support device consisting of:

an upper base portion for engaging a butt end of a rod, and a lower base portion having a left substantially straight tubular portion with left open end, a right substantially straight tubular portion with right open end, and a single lower inwardly bent concave curved surface portion located between the left tubular portion and the right tubular portion for engaging a portion of a body of a fisherman, the single lower inwardly bent concave surface being directly underneath the upper base portion and the single lower inwardly bent concave curved surface portion having an approximately 20 degree bend;

a first cushion sleeve solely wrapped entirely about the left substantially straight tubular portion;

a second cushion sleeve solely wrapped entirely about the right substantially straight tubular portion, the first and the second cushion sleeves adding confort and reducing injury to a fisherman, wherein the single lower inwardly bent concave curved surface portion remains exposed between the first cushion sleeve and the second cushion sleeve;

a first plastic end cap having a rounded end surface covering the left open end of the left substantially straight tubular portion for protecting against sharp edges; and a second plastic end cap having a rounded end surface covering the right open end of the right substantially straight tubular portion, for protecting against sharp edges, the rounded end surface of the first plastic end cap facing in a substantially opposite direction from the rounded end surface of the second plastic end cap, wherein the butt end of the rod is easily insertable and removable from the upper portion of the upper base portion when the rod support device is placed against one of an underarm or an abdomen or a thigh of the fisherman when being used which provides leverage, stability, and mobility while allowing fishing in comfortable versatile positions without causing discomfort, pain and injury to the fisherman.

2. The fishing rod support device of claim 1, wherein the upper base portion includes:

a tubular holder extending upward from the upper base portion, the tubular holder having a rod cavity for tightly receiving the butt end of the rod.

3. The fishing rod support device of claim 1, wherein the upper base portion includes:

a bushing for lining a cavity interior so that the butt end of the rod is tightly received therein.

4. The fishing rod support device of claim 2, wherein the upper base portion includes:

a bushing for lining the cavity so that the butt end of the rod is tightly received therein.

5. The fishing rod support device of claim 1, further comprising:

a roll pin inside a cavity of the upper base portion that secures the rod to the device.

6. The fishing rod support of claim 1, further comprising:

a stand having a support surface and an upwardly protruding portion extending upwardly from the support surface for fitting within a cavity on the upper base portion of the rod support so that the rod support is supported by the stand when not being used.

* * * * *